United States Patent Office 3,792,004
Patented Feb. 12, 1974

3,792,004
HIGH MOLECULAR WEIGHT PRODUCTS
CAPABLE OF BEING CROSS-LINKED
Josef Pedain and Dieter Arlt, Cologne-Buchheim, and Hermann Hagemann, Cologne-Flittard, Germany, assignors to Bayer Aktiengesellschaft, Leverkusen, Germany
No Drawing. Filed July 10, 1970, Ser. No. 54,005
Claims priority, application Germany, July 17, 1969,
P 19 36 399.6
Int. Cl. C08g 22/08, 22/18
U.S. Cl. 260—22 TN                          5 Claims

ABSTRACT OF THE DISCLOSURE

High molecular weight compounds capable of being cross-linked by the application of heat under mild conditions and having the general formula

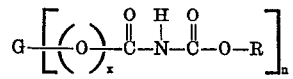

where G is the residue remaining after removal of at least two hydroxyl groups or at least two carboxylic acid groups from a high molecular weight polyhydric alcohol or high molecular weight polycarboxylic acid respectively; R is an aliphatic hydrocarbon radical having 1 to 18 carbon atoms or a trichloromethyl group; $x$ is 0 or 1 and $n$ is an integer equal to the number of hydroxyl groups or carboxylic acid groups removed from G.

This invention relates to polymers capable of being cross-linked by the application of heat and to a method of preparing the same.

The cross-linking of high molecular weight compounds which contain hydroxyl groups by the addition of formaldehyde or formaldehyde derivatives is already known. In this process, a mixture of the high molecular weight compound which contains hydroxyl groups and the formaldehyde compound is cross-linked by heating, if desired in the presence of an acid catalyst. A disadvantage of this process is that it involves a two-component system and that in many cases the reactants readily separate from each other due to insufficient compatibility or insufficient solubility.

Polymers which can be cross-linked by a one-component process, which are obtained by reacting hydroxyl-containing or carboxyl-containing polymers with mono-isocyanates and which also contain a masked formaldehyde function, are also known (Italian patent specification Nos. 823,272 and 823,273 and German auslegeschrift No. 1,244,410). The disadvantage of these systems, however, is that their preparation requires several hours' heating, preferably in the presence of catalysts.

It is an object of the invention to provide polymers which overcome the disadvantages of the heretofore known. It is a further object of this invention to provide high molecular weight compounds capable of being cross-linked by the application of heat. It is another object to provide a method of making polymers capable of being cross-linked by the application of heat. It is still another object to provide polymers capable of being converted to a cross-linked state under mild conditions without the use of catalysts.

The foregoing objects and others which will become apparent from the following description are accomplished by providing high molecular weight compounds capable of being cross-linked by the application of heat under mild conditions and having the general formula

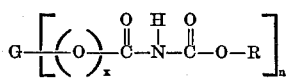

where G is the residue remaining after removal of at least two hydroxyl groups or at least two carboxylic acid groups from a high molecular weight polyhydric alcohol or high molecular weight polycarboxylic acid respectively; R is an aliphatic hydrocarbon radical having 1 to 18 carbon atoms or a trichloromethyl group; $x$ is 0 or one and $n$ is an integer equal to the number of hydroxyl groups or carboxylic acid groups removed from G. The average molecular weight of G will be at least about 500 and will be derived by removal of hydroxyl groups or carboxylic acid groups from polyhydric alcohols or polycarboxylic acids having respectively molecular weights of at least 600. The value of $n$ as stated above is equal to the number of —OH or —COOH groups removed from G and preferably is an integer of 2 to 6. Most preferably $n$ will have a value of 2 to 4.

The compounds having the formula set forth above are prepared by reacting hydroxyl-containing and/or carboxyl-containing high molecular weight compounds with alkoxycarbonyl isocyanates of the general formula:

in which R has the same meaning as set forth above.

The present invention thus relates to a process for the preparation of cross-linkable high molecular weight compounds which are characterized in that polymerization, polyaddition or polycondensation products which contain hydroxyl and/or carboxyl groups and which have an average molecular weight of at least 600 are reacted with an alkoxy carbonyl isocyanate of the general formula:

in which R represents an aliphatic hydrocarbon radical having 1 to 18 carbon atoms or a trichloromethyl group. The invention also relates to the products prepared by this process.

The high molecular weight starting materials used for the preparation of the cross-linkable products according to the invention may contain other functional groups in addition to the hydroxyl and/or carboxyl groups, e.g. carbonamide or epoxy groups.

Polycondensation and polyaddition products which have a molecular weight above 600, e.g. polyesters, polyester amides, polyethers, polythioethers, polyamides, polycarbonates, polyepoxides, polyacetals, polyurethanes, polyureas which contain hydroxyl and/or carboxyl groups as a result of suitable modification, and cellulose and its derivatives are suitable for the preparation of the cross-linkable products according to the invention.

Suitable polyesters are, for example, the polyesters of polycarboxylic acids such as adipic acid, succinic acid, maleic acid, phthalic acid, isophthalic acid, terephthalic acid, hexahydrophthalic acid, hexachloro endomethylene tetrahydrophthalic acid, trimellitic acid, pyromellitic acid and polyalcohols such as ethylene and propylene glycol, butane-1,3,-diol, butane-1,4-diol, hexanediols, diethylene glycol, tripropylene glycol, xylylene glycol, glycerol, trimethylol propane, pentaerythritol, mannitol and their hydroxyalkylation products; polyesters of hydroxy pivalic acid, thioglycollic acid, ω-hydroxydecanoic acid, caprolactone and propiolactone; polycarbonates prepared from polyphenols or polyalcohols by condensation reactions with phosgene or dialkyl or diaryl carbonates; furthermore, polyesters which have been modified with fatty acids and polyesters which contain amide groups due to the incorporation of aminoalcohols.

Suitable polyethers are, for example, those obtained from polyols such as ethylene glycol, propylene glycol, butane-1,3-diol, butane-1,4-diol, hexanediols, lycerol, trimethylol propane, pentaerythritol, mannitol, sorbitol and alkylene oxides such as ethylene, propylene and butylene oxide, styrene oxide, epichlorohydrin and bis-2,3-epoxypropyl ethers of diphenylol propane, or those obtained from trimethylene oxide or tetrahydrofuran.

The following are given as examples of other polyaddition and polycondensation products suitable for the reaction according to the invention with alkoxycarbonyl isocyanates: polythioethers of thiodiglycol, polyacetals of formaldehyde and diols, such as the diols mentioned above, naturally occurring polyacetals such as starch, dextrin and cellulose and their acylation and degradation products; polyamides of diamines and dicarboxylic acids, e.g. of hexamethylene diamine and adipic acid with terminal carboxyl groups, polyurethanes, e.g. those obtained from low molecular weight polyols such as ethylene or propylene glycol, butanediols, hexanediols, di- and tri-ethylene glycol, thiodiglycol, di-($\beta$-hydroxy-ethyl) ester of adipic acid, glycerol, trimethylol propane, mannitol, glucoses obtained by polyaddition with polyisocyanates such as hexamethylene diisocyanate, tolylene diisocyanate, 4,4'-diisocyanato-diphenylmethane, 1,5-naphthylene diisocyanate and 4,4',4''-triphenylmethane triisocyanate; polyureas, e.g. of diamines such as hexamethylene diamine and polyisocyanates such as hexamethylene diisocyanate or tolylene diisocyanate with incorporation of aminoalcohols into the macromolecule. Polyepoxide resins, e.g. the resins based on bis-(2,3-epoxypropyl) ether of diphenylol propane or butanediol, which contain secondary hydroxyl groups, should also be mentioned.

Any polymers which have an average molecular weight above 600 and, in the preparation of which, at least 0.5% of comonomers having hydroxyl and/or carboxyl groups has been used are suitable polymerization products for the preparation of the cross-linkable high molecular weight compounds. For example, homo- and co-polymers with acrylic acid, methacrylic acid, crotonic acid, maleic acid, cinnamic acid, $\beta$-hydroxyethyl ester and $\beta$-hydroxypropyl ester of acrylic acid, ethyl- and propyl-ester of $\beta$-hydroxy methacrylic acid, 6-hydroxyhexyl ester of methacrylic acid, allyl alcohol, 2-hydroxyethyl ester of maleic acid, di-2-hydroxyethyl ester of maleic acid, 5-methylol-bicyclo-2,2,1-heptene, N-hydroxy-ethylmethacrylamide and methacrylic acid N-di-($\beta$-hydroxy-ethyl)-amide are suitable.

Copolymers of these monomers with other polymerizable compounds such as methyl, ethyl and butyl esters of acrylic acid, methyl, ethyl, butyl and hexyl esters of methacrylic acid, styrene, vinyl acetate, vinyl chloride, vinylidene chloride, vinyl butyl ether, N-vinylpyrrolidone, N-vinyl ureas or urethanes, acrylonitrile, ethylene, propylene, butadiene, isoprene and chloroprene are also suitable.

Furthermore, polymers into which hydroxyl or carboxyl groups are subsequently introduced by graft reactions or by hydrolysis may also be used as starting materials. The following are given as examples: polyvinyl alcohol, partly saponified polyvinyl acetate, partly saponified copolymer of polyvinyl acetate and polyethylene, partly saponified polyacrylic ester, partly saponified polyvinylidene carbonates, graft polymers such as vinyl compounds on linear or branched polyethers. The starting materials for the preparation of the products of the process may be branched or linear and have a molecular weight of 600 to 500,000.

Any alkoxycarbonyl isocyanates are suitable for the reaction with the high molecular weight starting materials, e.g. methoxycarbonyl isocyanate, trichloromethoxycarbonyl isocyanate, ethoxycarbonyl isocyanate, n-propoxy- and i-propoxycarbonyl isocyanate, isobutoxycarbonyl isocyanate, butoxycarbonyl isocyanate, octoxycarbonyl isocyanates, pentadecyloxycarbonyl isocyanates, tertiary butoxycarbonyl isocyanates, hexoxycarbonyl isocyanate and octadecyloxycarbonyl isocyanate. Alkoxycarbonyl isocyanates may be prepared according to the instructions given in Journal of Org. Chem. 30 4306 (1965). The reaction of the alkoxycarbonyl isocyanates with the hydroxyl-containing and/or carboxyl-containing high molecular weight products will take place when the reactants are simply brought together, which are advantageously already at room temperature or even lower temperatures. A temperature range of about —50 to about 150° C. is suitable and the preferred temperature range is about 0 to about 60° C.

The reaction may be carried out in solvents which are inert to alkoxycarbonyl isocyanates, e.g. esters such as ethyl acetate or ethyl glycol acetate, hydrocarbons such as toluene or xylene, ketones such as acetone or butanone, chlorinated hydrocarbons such as methylene chloride or chlorobenzene or dialkylated amides such as dimethyl formamide, but the reaction of the starting materials may also be carried out without solvents, simply by mixing them. Insoluble high molecular weight products may also be reacted.

The reaction between alkoxycarbonyl isocyanates and high molecular weight products which contain hydroxyl and/or carboxyl groups is carried out in such proportions that the hydroxyl or carboxyl groups are reacted with an equivalent or less than equivalent quantity of alkoxycarbonyl isocyanate, i.e. with an NCO/OH or NCO/COOH ratio of 0.01 to 1, preferably 0.3 to 1. The quantity of alkoxycarbonyl isocyanate entering into the reaction depends on the degree of branching of the high molecular weight substance and on the properties required in the product of the process.

The products according to the invention obtained by the process according to the invention are, surprisingly, thermally cross-linkable by heating them to temperatures above approximately 50° C. High molecular weight compounds which have valuable material properties, e.g. resistance to chemicals, are obtained. The reaction temperature can be lowered and the time required for the cross-linking action reduced by the addition of a catalyst. The catalysts may be acids, bases or salts, e.g. hydrochloric acid, phosphoric acid, p-toluene sulphonic acid, maleic acid, potassium hydroxide, aluminum trichloride or the morpholine salt of p-toluene sulphonic acid.

The products according to the invention are valuable cross-linkable plastics or plastics intermediate products. They are suitable for the production of cross-linked plastic articles and foils, films, coatings and the like.

The invention is further illustrated but is not intended to be limited by the following examples in which all parts and percentages are by weight unless otherwise specified.

EXAMPLE 1

A branched polyester of 3 mol phthalic acid, 1.5 mol butane-1,3-diol, 0.5 mol hexane-1,6-diol and 1.7 mol trimethylol propane, which has a hydroxyl number of 137 and an acid number of 2.8 is dissolved in ethyl acetate to form a 50% solution. The following are added in each case to about 2000 parts of the solution at 20° C. with vigorous stirring.

(a) about 101 parts of methoxycarbonyl isocyanate,
(b) about 115 parts of ethoxycarbonyl isocyanate,
(c) about 143 parts of butoxycarbonyl isocyanate,
(d) about 199 parts of octoxycarbonyl isocyanate,
(e) about 205 parts of trichloromethoxycarbonyl isocyanate.

In all cases, an exothermic reaction sets in so that the solvent boils. The reaction is terminated after a few minutes and no more free isocyanate can then be detected in the solution. The solutions are treated with about 2% of phosphoric acid, poured on to glass plates and hardened at about 130° C. for about 30 minutes. After cooling foils are obtained which can be stripped from the glass plate. None of the five samples was attacked by the solvent when treated with boiling ethyl acetate. Even when boiling dimethyl formamide is used as solvent, only a reversible swelling effect was observed.

The samples can also be hardened without acid catalyst by heating them to about 150° C. for about 30 minutes. Insoluble foils are again obtained. In contrast, unmodified solutions of the polyester in ethyl acetate with about 2% of phosphoric acid are dried for about 30 minutes at about 130 and about 150° C. and the films are treated with ethyl acetate. The sample in each case dissolved completely in the solvent in a few seconds at about 20° C.

EXAMPLE 2

About 150 parts of a polyester of 1.7 mol propane-1,2-diol, 0.3 mol hexane-1,6-diol, 2 mol trimethylol propane and 3 mol phthalic acid, having a hydroxyl content of 5.4% and an acid number of 2.1, are dissolved in about 33 parts of ethyl glycol acetate, and about 15 parts of methoxycarbonyl isocyanate are added dropwise at about 50° C. The reaction is finished when all the methoxycarbonyl isocyanate has been added. The 75% solution is poured out on iron sheets and heated at about 160° C. for about 30 minutes. Cross-linked foils which merely swell in acetone and ethyl glycol acetate are obtained.

EXAMPLE 3

The same procedure is used as in Example 2, about 150 parts of the polyester given there being dissolved in about 39 parts of ethyl glycol acetate and reacted with about 26 parts of methoxycarbonyl isocyanate. After the solution has been dried on glass plates at about 150° C. for about 30 minutes, hard films which do not even swell in acetone or ethyl glycol acetate but remain completely unchanged are obtained.

The stoving temperature can be lowered by using catalysts. When about 1 part of phosphoric acid is added to about 50 parts of the solution, highly solvent resistant films are obtained after about 30 minutes at only about 30° C. When about 3 parts of a 30% solution of potassium hydroxide in ethanol are added to about 50 parts of solution, sufficiently cross-linked films are obtained by heating at about 120° C. for about 30 minutes.

EXAMPLE 4

The same procedure is employed as in Example 2, about 150 parts of the polyester mentioned there being dissolved in about 67 parts of ethyl glycol acetate and reacted with about 49 parts of methoxycarbonyl isocyanate. This means that all the free hydroxyl groups are converted to urethane groups. The film is again hardened without additive at about 160° C. for about 30 minutes, and high elastic, fully cross-linked colorless foils are obtained.

EXAMPLE 5

About 1000 parts of an alkyd resin which has been prepared from 420 parts by weight phthalic acid anhydride, 500 parts by weight trimethylol propane and 300 parts by weight of a mixture of monofatty acids containing 8 to 14 carbon atoms and which contains about 5% of hydroxyl groups and has an acid number of 15 are dissolved in about 380 parts of xylene. The solution is reacted with about 150 parts of methoxycarbonyl isocyanate at about 20° C. The reaction proceeds exothermally and is finished after about 30 minutes. The very viscous solution is poured on to glass plates and the solvent is left to evaporate. The high acid number of the resin enables the substance to be hardened at a low temperature. At about 120° C., completely cross-linked, clear films which are insoluble in xylene are obtained in about 30 minutes.

For comparison, the unmodified solution of alkyd resin is poured on a glass plate and heated at about 120° C. for about 30 minutes. Hardening does then not take place. The surface remains soft and sticky and the layer of film readily dissolves in xylene.

EXAMPLE 6

About 100 parts of a liquid copolymer consisting of 60% by weight of butadiene and 40% by weight of hydroxypropyl methacrylate obtained by radicalic polymerization and containing 4.7% hydroxyl groups are reacted with about 13.6 parts of methoxycarbonyl isocyanate without solvent at about 50° C., and after termination of the reaction, the product is heated at about 160° C. for about 30 minutes. A non-sticky, highly elastic synthetic resin is thereby obtained which is insoluble in solvents such as acetone or ethyl acetate.

EXAMPLE 7

About 50 parts of a liquid branched polycarbonate which has been prepared by the reaction of about 3 mols of trimethylol propane, 2 mols of hexane-1,6-diol and 4 mols of diphenyl carbonate and which has a hydroxyl number of 354 are reacted with about 32.1 parts of methoxycarbonyl isocyanate. The reaction is finished within about 10 minutes at about 40° C. A sample of the substance is then heated at about 160° C. for about one hour and a hard but highly elastic synthetic resin is obtained. Another sample is dissolved in ethyl glycol acetate. Copper and aluminum wires are dipped into the solution and subsequently heated to about 160° C. for about 30 minutes. After heating, the wires are coated with a hard, firmly adhering synthetic resin film which is insoluble in ethyl glycol acetate.

EXAMPLE 8

About 50 parts of methoxycarbonyl isocyanate are introduced dropwise at about 20° C. into about 666 parts of a 75% solution in xylene of an epoxy resin of 2,2'-bis-p-hydroxyphenyl propane and epichlorohydrin which has a hydroxyl group content of 2.3%, an average molecular weight of 1000 and contains secondary hydroxyl groups. The solution heats up to about 90° C. during the reaction which takes place instantaneously. About one minute after the methoxycarbonyl isocyanate has been added, no free NCO can be detected in the solution. After addition of 0.5% of phosphoric acid, the solution is poured out on aluminum sheets and heated to about 150° C. for about 45 minutes. Elastic synthetic resin layers which are insoluble in xylene are obtained on the sheets.

For comparison, the solution which has not been modified with alkoxycarbonyl isocyanate but only treated with phosphoric acid is applied to a metal sheet and also heated at about 150° C. for about 45 minutes. A hard, brittle layer is obtained which cracks and becomes detached from the sheet and is easily soluble in xylene.

EXAMPLE 9

About 100 parts of a copolymer of vinyl chloride and vinyl acetate in a 1:1 ratio in which vinyl acetate is partly hydrolyzed so that the substance has a hydroxyl content of 2.1% are dissolved in about 300 parts of anhydrous acetone. The solution is reacted with about 6 parts of methoxycarbonyl isocyanate at about 40° C., 1% of p-toluene sulphonic acid is added and the solution is poured out on glass plates which are heated to about 130° C. for about 30 minutes after evaporation of the solvent. Cross-linked, solvent-resistant foils are obtained. By contrast, foils of unmodified copolymer are not cross-linked and are soluble.

EXAMPLE 10

A polyurethane with terminal hydroxyl groups, composed of about 594 parts of 4,4'-diphenylmethane diisocyanate, about 135 parts of butane-1,4-diol and about 1695 parts of a polyester of hexane-1,6-diol, neopentyl glycol and adipic acid is dissolved to form a 25% solution in a mixture of butanone/dimethyl formamide. About 100 parts of this solution are reacted with 2.1 parts of methoxycarbonyl isocyanate by introducing the isocyanate dropwise at about 20° C. The reaction has rendered the polyurethane self-cross-linking. A film dried on a glass plate at about 180° C. after the addition of about 1% of phosphoric acid shows distinctly less swelling in butanone than an unmodified polyurethane treated in the same way.

EXAMPLE 11

About 50 parts of a polymer of 850 parts by weight of hydroxymethylnorbornene, 400 parts by weight of ethyl hexyl acrylate, 250 parts by weight of methylmethacrylate and 40 parts by weight of acrylic acid amide obtained by radicalic polymerization and which has a hydroxyl number of 161 are dissolved in about 50 parts of isobutylmethyl ketone, and about 15 parts of butoxycarbonyl isocyanate are added dropwise to the solution. The solution is vigorously stirred during the exothermic reaction. By the time all the butoxycarbonyl isocyanate has been added, the reaction is practically complete. The clear solution which contains the self-cross-linking polymer is poured out on metal plates. These are hardened at various temperatures. Films which were hardened for about 30 minutes below about 120° C. are practically unchanged. The onset of cross-linking of the films can be observed after about 30 minutes at about 120° C. Films which have optimum properties and are hard and elastic and completely insoluble in solvents such as methylisobutyl ketone or toluene are obtained after about 30 minutes at about 150° C.

EXAMPLE 12

About 100 parts of a branched polyether which has been prepared from 1 mol trimethylol propane and 6.3 mol propylene oxide and has a hydroxyl content of 11.5% are reacted without solvents with about 68 parts of methoxycarbonyl isocyanate. The reaction product dissolves to form a clear solution in ethyl acetate. After the substance has been heated for about 30 minutes at about 180° C., it is completely insoluble in ethyl acetate and an elastic, cross-linked resin has been obtained.

EXAMPLE 13

About 150 parts of a 50% solution of a copolymer in methyl glycol acetate, the copolymer being of 25% by weight of hydroxypropyl methacrylate, 40% by weight of ethyl acrylate and 35% by weight of methyl acrylate and having the hydroxyl number 88 are reacted with about 15 parts of methoxycarbonyl isocyanate at 20 to 40° C. with vigorous stirring. A clear, colorless solution of the polymer which has become self-cross-linking is obtained. About 1% phosphoric acid is added and the solution is painted on aluminum sheets and stoved for about 30 minutes at about 180° C. Films which have good resistance to methyl glycol acetate and adhere firmly to the aluminum surface are obtained.

EXAMPLE 14

A hydroxyl-containing copolymer is prepared by radical polymerization of about 20% of hydroxypropyl methacrylate, about 30% of butyl acrylate and about 50% styrene in 50% xylene solution. The solution contains 1.32% of hydroxyl groups. About 200 parts of this solution are reacted with about 20 parts by weight of butoxycarbonyl isocyanate at about 40° C. Most of the xylene is evaporated under vacuum and the residue is heated to about 150° C. under reduced pressure. A solid synthetic resin which can be pulverized and is highly cross-linked and insoluble in boiling xylene is obtained.

EXAMPLE 15

About 100 parts of a polyether which has 11.5% of hydroxyl groups as described in Example 12 are heated to about 150° C. for about 3 hours, with about 65 parts of maleic acid anhydride. The reaction mixture is thoroughly stirred during this time and the excess maleic acid anhydride is then removed by application of reduced pressure. A polyether ester which has no free hydroxyl groups and which dissolves to form a 50% solution in ethyl glycol acetate is obtained.

About 10 parts of butoxycarbonyl isocyanate are added dropwise to about 32 parts of the solution. The reaction is left to continue until carbon dioxide evolution ceases and the solution is then poured out on glass plates and hardened for about 30 minutes at about 180° C. When cold, the coatings are insoluble in ethyl glycol acetate.

EXAMPLE 16

About 30 parts of a polyester which consists of 3.6 mol of phthalic acid, 3 mol of ethane diol and 4 mol of trimethylol propane and contains 12% of hydroxyl groups are dissolved in about 16 parts of ethyl glycol acetate, and about 18 parts of methoxycarbonyl isocyanate are added dropwise. During the addition of methoxycarbonyl isocyanate, the temperature in the reaction vessel rises to about 40° C. as a result of the exothermic reaction. When all the methoxycarbonyl isocyanate has been added, a solution of the cross-linkable polyester is immediately obtained without requiring additional processing. Two samples of the solution are stoved for about 30 minutes at about 130° C. after the addition of about 1% of phosphoric acid and after the addition of about 1% of potassium hydroxide. In both cases, clear films which are resistant to solvents are obtained.

Comparison test with methoxymethyl isocyanate

The same polyester is used as indicated in the immediately preceding example and about 15.5 parts of methoxymethyl isocyanate are added to a solution of about 30 parts of the polyester in about 16 parts of ethyl glycol acetate at about 20° C. No exothermic reaction can be observed. After about 24 hours at about 20° C., the solution still contains about 5% of NCO. About 0.002 part of tin dioctoate are then added and the reaction mixture is stirred for about 4 hours at about 70° C. Only then is the reaction finished.

Samples of the solution yield well cross-linked films at about 130° C. with about 1% of phosphoric acid. With about 1% of potassium hydroxide, the polyester cannot be cross-linked in about 30 minutes at about 130° C. Sticky layers which are soluble in ethyl glycol acetate are obtained.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A high molecular weight compound capable of being cross-linked by the application of heat and having the formula

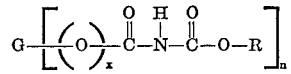

where G is the residue remaining after removal of at least two hydroxyl groups or at least two carboxylic acid groups from a high molecular weight polyhydric alcohol or polycarboxylic acid respectively, said polyhydric alcohol or polycarboxylic acid having a molecular weight of at least about 600; R is an aliphatic hydrocarbon radical having 1 to 18 carbon atoms or a trichloromethyl group; $x$ is 0 or 1 and $n$ is an integer equal to the number of hydroxyl groups or carboxylic acid groups removed from G.

2. The compound of claim 1 wherein $n$ is an integer of 2 to 6.

3. The compound of claim 1 wherein $x$ is 1.

4. The compound of claim 1 wherein R is an aliphatic hydrocarbon radical having 1 to 18 carbon atoms.

5. The compound of claim 1 wherein R is a trichloromethyl group.

References Cited
UNITED STATES PATENTS

| | | | |
|---|---|---|---|
| 3,480,591 | 11/1969 | Oertel et al. | 260—75 |
| 3,248,349 | 4/1966 | Szabat et al. | 260—2.5 |
| 3,450,747 | 6/1969 | Smith et al. | 260—479 |
| 3,449,467 | 6/1969 | Wynstra | 260—850 |

HOSEA E. TAYLOR, Primary Examiner

R. W. GRIFFIN, Assistant Examiner

U.S. Cl. X.R.

260—75 NT, 77.5 AT, 77.5 D, 545